United States Patent [19]

Asakura et al.

[11] 4,112,187

[45] Sep. 5, 1978

[54] MAGNETIC RECORDING MEDIUM SUPPORTED ON AROMATIC POLYAMIDE

[75] Inventors: Toshiyuki Asakura; Masaaki Itoga, both of Otsu; Takeshi Hayakawa, Kyoto; Masamitsu Tanimura, Otsu, all of Japan

[73] Assignee: Toray Industries, Inc., Tokyo, Japan

[21] Appl. No.: 678,365

[22] Filed: Apr. 19, 1976

Related U.S. Application Data

[63] Continuation-in-part of Ser. No. 536,256, Dec. 24, 1974, Pat. No. 3,966,686.

[30] Foreign Application Priority Data

Dec. 28, 1973 [JP] Japan .................................. 49-1682

[51] Int. Cl.$^2$ ........................ H01F 10/04; G11B 5/78
[52] U.S. Cl. .................................. 428/474; 360/134; 427/128; 428/539; 428/900
[58] Field of Search ................ 360/134; 340/174 TF; 427/127, 128, 129, 130, 131, 132; 428/900, 474, 539, 340; 260/78 A, 857 PA, 47 ET; 264/184, 212

[56] References Cited

U.S. PATENT DOCUMENTS

| | | | |
|---|---|---|---|
| 3,472,819 | 10/1969 | Stephens | 260/78 A |
| 3,512,930 | 5/1970 | Bottjer et al. | 427/128 |
| 3,652,510 | 3/1972 | Blomberg | 260/78 A |
| 3,751,546 | 8/1973 | Haroldt | 264/184 |
| 3,767,756 | 10/1973 | Blades | 264/184 |
| 3,796,693 | 3/1974 | Morgan et al. | 260/78 A |
| 3,817,941 | 6/1974 | Blair et al. | 260/78 A |
| 3,881,046 | 4/1975 | Akashi et al. | 428/900 |
| 3,967,025 | 6/1976 | Tanabe et al. | 360/134 |

*Primary Examiner*—Stanley S. Silverman
*Attorney, Agent, or Firm*—Miller & Prestia

[57] ABSTRACT

An improved magnetic recording medium comprising a flexible support consisting of at least about 70 mol % of p-oriented aromatic polycarbonamide units. The polycarbonamide may include substituent groups on the aromatic nuclei. The support has a density of more than about 1.41 g/cm$^3$ at 25° C and 0% relative humidity, and a tensile modulus higher than about 800 kg/mm$^2$ in at least one direction, combined with a thin layer of magnetically susceptible material deposited electrically or dispersed in a nonmagnetic binder. The magnetic recording medium in this invention shows excellent running performance and has superior dimensional stability both thermally and hygroscopically.

19 Claims, No Drawings

MAGNETIC RECORDING MEDIUM SUPPORTED ON AROMATIC POLYAMIDE

CROSS REFERENCE TO RELATED APPLICATION

This application is a continuation-in-part of our application filed on Dec. 24, 1974, U.S. Ser. No. 536,256, now U.S. Pat. No. 3,966,686 titled "Aromatic Polyamide-Type Films and Method of Manufacture Thereof."

BACKGROUND OF THE INVENTION

Although films of polyethylene terephthalate and cellulose acetate have been in wide commercial use as base flexible materials for magnetic recording media, e.g., magnetic audio and video recording tape, recently a number of deficiencies for these films have been recognized. Such deficiencies apply to many practical requirements, such as increase of recording capacity or time for a given volume of recording tape cassette, and improvement of the operation performance thereof. Magnetic recording tapes supported on polyester type film, for example, when it has less than a certain thickness, exhibits poor running performance, such as irregular tape running (so-called stick and slip), clogging on recording heads, appreciable permanent elongation under play-back tension and damage at tape edge. This is because of unsatisfactory mechanical properties of the tape, especially low lengthwise and transverse tensile modulus. Prior art tapes have also other recognized deficiencies, for example, poor dimensional stability both thermally and hygroscopically (causing undesirable sound distortion for audio tape and skew for video tape) and undesirable powder formation upon keeping contact with the recording head and guide pins, causing noise and drop-out. Furthermore, such tapes are not suitable for magnetic duplication by the thermal process using $CrO_2$ which is the preferable method for better transfer efficiency. This is because of poor dimensional stability of the tape at higher temperatures.

After extensive work to overcome these deficiencies of the prior art, it has now been found that an especially desirable and useful magnetic recording medium can be made from a film or sheet consisting essentially of p-oriented aromatic polycarbonamide units, and that this material has hitherto unattainable highly favorable mechanical and thermal performance characteristics. The medium in accordance with the present invention can provide especially improved magnetic tapes, such as $CrO_2$ magnetic tapes for thermal duplication, and can produce much thinner tapes with satisfactory stiffness, wear life and excellent runnability compared with conventional magnetic tapes.

SUMMARY OF THE INVENTION

This invention relates to a magnetic recording medium comprising a flexible support and an adherent thin layer of magnetizable particles dispersed in a binder thereon. The flexible support of this invention consists essentially of p-oriented aromatic polycarbonamide units which may have substituent groups on the aromatic nuclei thereof, selected from the group consisting of halogens, nitro and alkyl and alkoxy with a number of carbon atoms of 1 to 3. Although in order to obtain the fullest advantage of the present invention, it is preferred that from about 0 to 5 mol percent of such comonomers as meta-oriented, aliphatic, bridged phenylenes, and non-amide reactants be used, at most about 30 mol % of the comonomers may be used within the scope of this invention. The flexible supports are also characterized by having a density of more than about 1.41 $g/cm^3$, preferably above 1.45 $g/cm^3$, and have a tensile strength in excess of about 30 $kg/cm^2$, preferably 40 $kg/cm^2$. Furthermore, the supports have a Young's tensile modulus higher than about 800 $kg/mm^2$ in at least one direction, preferably in both the machine and transverse directions, and have a hygroscopic linear expansion coefficient of less than about $2 \times 10^{-5}$ mm/mm/%RH, preferably $1 \times 10^{-5}$ mm/mm/%RH, in one direction.

The novel magnetic recording mediums, e.g., magnetic recording tapes, are provided by forming a magnetically susceptible thin layer on the above support film. Thinner magnetic tapes of this invention which give a longer recording time work with satisfactory operating performances in respect of durability, stable running, skew and tape edge damage, for example. Tapes of this invention using $CrO_2$ as a magnetizable material can be utilized as high quality tapes for thermal duplication. Furthermore, this invention provides improved magnetic tapes with excellent adhesion and wear resistance by hardening the magnetic composition at a higher temperature.

DETAILED DESCRIPTION OF THE INVENTION

This invention relates to an improved magnetic recording medium comprising a flexible support and an adherent thin layer of a magnetic composition. More particularly, the invention relates to a support consisting of a p-oriented aromatic polycarbonamide as a major chain constituent. Although the description hereinafter is mainly concerned with magnetic audio and video recording tapes as representatives of magnetic recording media, other media are also within the scope of this invention.

Widely commercialized magnetic recording tapes, provided with a support of polyester film, have many excellent properties and have been quite adequate for many applications. However, for some uses, there is a need for improved recording tapes having better mechanical and thermal properties. These requirements are related, for example, to helical-scan video recording, where the stiffness and wear-life requirements are especially stringent because of high relative speed between the running tape and the rotating head. For duplication of video tape, the thermal transfer method, which requires better thermal stability than that possessed by polyester film, has much better transfer efficiency than the anhysteretic methods which are widely accepted at present. For a cassette of audio or video tape having longer playing time, reduction of support film thickness without sacrifice of toughness and stiffness is required. The main objects of this invention are to provide an improved magnetic recording medium which meets the rather stringent requirements above exemplified that are not attainable by products of the prior art.

One advantage of magnetic recording tapes of this invention is excellent runnability, as well as the possibility of reducing tape thickness while retaining necessary toughness and stiffness. Running performance or runnability of tapes means stability of picture and sound reproduction, skew behavior, off-track absence of frayed edges, etc. These improvements are related to excellent mechanical properties of the support film. Further advantages of this invention, owing to a thermal stability of support film, include the provision of a recording tape with strong adhesion and long wear-life. A tape which may be accepted for thermal duplication is also made available by virtue of this invention.

These advantages do not simply result from the chemical constitution of the support film, but are derived also from certain unexpected improved physical properties, and are enhanced by providing a suitable combination of the foregoing properties with a novel preparation process for producing a magnetically susceptible layer.

In making a magnetic recording medium according to this invention, it is essential to use a p-oriented polycarbonamide having recurring units of the formula:

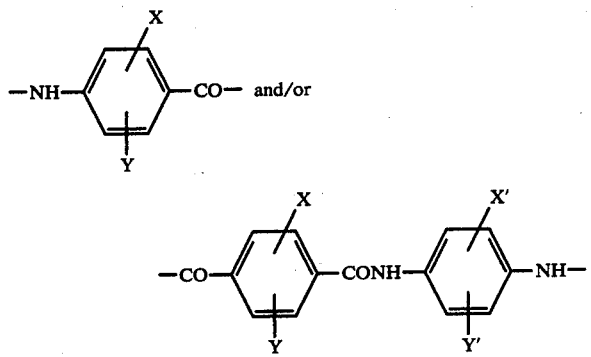

wherein X, Y, X' and Y' are selected from the group consisting of hydrogen, halogen (Cl or Br), nitro group, and alkyl and alkoxy group having one to three carbon atoms. Although, in order to obtain the fullest advantage of the present invention, it is preferred to use from about 0 to 5 mol percent of comonomer selected from the non p-oriented polyamide units, at most about 30 mol% of comonomer units may be used within the scope of this invention. Representative non p-oriented polyamide units are comonomers containing entities such as directly linked phenylenes

m-phenylene

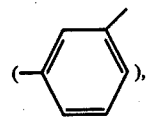

urethane (—NHCOO—), urea (—NHCONH—), ester (—COO—), hydrazide (—CONHNH—) and ether (—O—) bonds, and aliphatic hydrocarbon groups ($C_1$ – $C_3$).

The physical properties required for a support film essentially consisting of the above constituents include a density greater than about 1.41 g/cm³ preferably about 1.45 g/cm³ and less tha about 1.70 g/cm³ at 25° C and 0% relative humidity, a Young's modulus greater than about 800 kg/mm² and smaller than about 20,000 kg/mm² in at least one direction, preferably of greater than about 800 kg/mm² and smaller than about 10,000 kg/mm² in both the machine and transverse directions at 25° C and 75% relative humidity, and preferably a tensile strength greater than 30 kg/mm² and smaller than 200 kg/mm², and both hygroscopic and thermal linear expansion coefficients of less than $2.0 \times 10^{-5}$ mm/mm/% relative humidity or mm/mm/° C. Most of the advantages of the magnetic recording tapes of this invention are obtained by combining the above specified physical properties of support films with the specific manufacturing processes and methods of said tapes. Accordingly, the methods of preparation of the support films must be carefully chosen and combined to produce the specified properties.

Usual additives such as fillers, antioxidants, surface adjusting materials, etc., may be incorporated into the support film. In this case the specified physical properties may be varied, depending upon the amounts and kinds of such additives.

Para-oriented polycarbonamides are an essential constituent of the support film of this invention. Furthermore, they may have one or a plurality of substituent group(s) on the aromatic nuclei to enhance the solubility of the polymer in a solvent and/or to improve certain physical properties. Halogen substituent groups, especially chlorosubstituent groups, are most preferable, because unexpected excellent hygroscopic dimensional stability is attainable by their use. A water absorption of less than 2.0 weight % at 25° C and 75% relative humidity and a hygroscopic linear expansion coefficient of less than $1.0 \times 10^{-5}$ mm/mm/% relative humidity are attainable with the use of chlorosubstituted p-oriented polycarbonamide film, suitably prepared. These are surprisingly excellent for a polymer having amide groups as the main chain.

The dimensional stability under the influence of hygroscopic change is a very important property in practical use of magnetic recording media. Furthermore, a chlorosubstituent p-oriented polycarbonamide can be dissolved in solvents such as N-methylpyrrolidone (NMP) and hexamethylphosphoramide (HMPA) with suitable inorganic salts. Therefore the polymer solution can be cast into a film directly after polymerization, that is, cast in-situ. This in-situ method cannot be applied to a p-oriented polycarbonamide with no substituent group, and this results in complicated processes of polymer separation and re-dissolution.

Some polymers can be prepared by a low temperature solution polymerization procedure, which is carried out below 80° C, preferably −20° C to 50° C. These include polymers of p-phenylene diamine (or their halogenated derivatives, etc.) and terephthalic acid (or their halogenated derivatives, etc.) or p-amino benzoyl chloride (or their halogenated derivatives, etc.), together with comonomers, if any. The polymerizations are accomplished in a solvent or mixture of solvents selected from the group of N,N-dimethylacetamide (DMAC), N-methyl-2-pyrrolidone (NMP), hexamethyl phosphoramide (HMPA), tetramethyl urea (TMU), etc. Polycarbonamides of high molecular weight with an inherent viscosity of at least 1.0 and up to 9.0 are particularly useful for film formation. In order to increase the solubility and stability of prepared polymer solutions, an ionic inorganic salt, such as lithium chloride, magnesium chloride, calcium chloride, lithium nitrate or other halides or nitrates of alkali metals or alkali earth metals may be added. Usually hydrogen chloride generated by the polymerization reaction is neutralized by calcium hydroxide, lithium hydroxide, propylene oxide or other amines before the solution is used for film casting. If the polymer system prepared is not a homogeneous solution, the polymer is separated from the solvent and inorganic additives, by washing with water or organic solvents such as acetone, may be dissolved again in any of the organic solvents listed above, or in others such as sulfuric acid. The kinds of solvents and additives have very important effects on the physical properties of the final films, as well as the polymer composition and manufacturing conditions. Other polymerization methods, for example interfacial polymerization, can be adopted for the preparation of this kind of polymer.

Such a polymer solution can be extruded through a narrow die-slit and cast onto a moving metal belt or drum in an oven, or directly into an aqueous medium. In the former case the solvent is evaporated from the cast film until it becomes a self-supporting film which can be peeled and then submerged into the aqueous medium, where the residual solvent and the ionic inorganic additives are extracted. It is desirable to optimize the conditions to enhance the extraction effect of the aqueous medium for reducing the concentration of the residual ionic compounds and organic solvents in the polymer films as low as possible. The residual impurities in the polymer films may often cause insufficient flatness and poor thermal stability. The film may be stretched in the machine direction and/or the transverse direction during and/or after extraction of the solvent and inorganic compounds. Then the film is dried and, if necessary, subjected to heat treatment. Some inorganic additives to enhance the roughness of the film surface may exist from the beginning.

It is desirable for the support film in this invention to have sufficient density and planar orientation. Preferably it has a density of more than about 1.41 g/cm$^3$, preferably more than 1.44 g/cm$^3$, and less than about 1.70 g/cm$^3$ at 25° C and 0% relative humidity and a planar orientation coefficient higher than about 0.65, preferably higher than 0.75. The advantages of this invention such as tape runnability, noiseless operation for picture and sound reproduction, reduction of tape thickness, etc., are enhanced by using a support film with greater tensile strength, tensile modulus and dimensional stability under changes of temperature and humidity. The higher planar orientation and the higher crystallinity of the polymer are quite favorable to the above described physical properties of the support film. A high degree of planar orientation improves not only the linear dimensional stability but also tensile strength and modulus both for the machine direction and the transverse direction. A high degree of crystallinity results in a decrease of water absorption, as well as increase of tensile strength and modulus. In order to obtain satisfactory planar orientation and crystallinity, the conditions for stretching and heat treatment of films have a vital influence on the structures of polymer chains in the final film, and must be carefully chosen. The planar orientation coefficient is measured by X-ray diffractometry, of a type referred to in L. E. Alexander's "X-ray Diffraction Method in Polymer Science", Sec. 4, pp. 198 (1909, Wiley-Interscience). The degree of crystallinity is represented by a density of film which defines the desirable range of this invention as one of its important parameters.

The film may be stretched in both the machine direction and the transverse direction by conventional methods, before or after heat treatment. The optimum draw ratio for a stretching process resulting in higher planar orientation and sometimes in a higher degree of crystallinity, ranges from about 1.01 to 2.0 for this film, depending upon the polymer composition, the solvents and the additives to the casting solution, the solvent contents and the drawing conditions.

Heat treatment resulting in an increase of film density, that is an increase of degree of crystallinity, may be performed at any temperature above the crystallization temperature. This can be measured from its dynamic mechanical loss peak or from a density dependence of the final film on the temperature where heat treatment is carried out, and is usually shown to be above 250° C for the final film.

The cyrstallization temperature, however, depends importantly upon the polymer composition and the amount of remaining solvents and additives. Therefore, the crystallization temperature may fairly be lower than 250° C for a wet film in the intermediate process where the solvents are not removed completely. A simple method for checking the crystallization temperature is to follow the degree of crystallinity or the density of said film being at the temperature existing. If an increase is observed, the temperature is looked upon as the apparent crystallization temperature.

The film is heated in hot air or inert gas, or by an infrared heater, while it is constrained, stretched or at least prevented from free shrinkage in both directions.

A film manufactured under the appropriate conditions in a manner to obtain the defined density and planar orientation, shows a tensile strength of more than 30 kg/mm$^2$ and less than 200 kg/mm$^2$ and a tensile modulus of more than 800 kg/mm$^2$, preferably more than 1200 kg/mm$^2$ and less than 20,000 kg/mm$^2$ in at least one direction. It has a thermal and hygroscopic linear expansion coefficient of at most $2.0 \times 10^{-5}$ mm/mm/° C (mm/mm/% relative humidity), said film being desirable for use as a support film for magnetic recording tapes in this invention.

The formation of a magnetic thin layer can be carried out by various well known methods. The film may be coated with a coating dispersion consisting of fine magnetizable particles such as $\gamma$-Fe$_2$O$_3$, CrO$_2$ dispersed in a non-magnetic solution containing polymeric binders, additives and solvents. Epoxy resin and poly (vinyl chloride-acetate) are typical examples of polymeric binders, but various other types of known polymeric binders can also be used without specific limitations. The dispersion is coated on the film by use of well known coating procedures such as gravure rolls, reverse rolls and devices of the doctor knife type. Magnetic-aligning and buffing or calendering are applied to the magnetic tape before or after the coating process.

A magnetic thin layer may be plated on the support film to form the magnetic recording tape of this invention.

The thickness of the magnetic tape manufactured by use of this invention can be reduced without interfering with tape runnability and deformation of recorded signals. In some cases the thickness may be reduced to less than half of that manufactured from poly (ethylene terephthalate). This advantage is mainly due to high tensile modulus of the support film; this keeps a satisfactory stiffness for the magnetic tape of reduced thickness, and also due to high tensile strength preventing tape deformation while the tape is subjected to a high instantaneous tension during playback. Furthermore, as the stiff and unfrayed tapes of this invention are tracked evenly by the heads, the tracks for recording can be placed at the very edge of the tape. This advantage, along with the thickness reduction of the tape, contributes to increased recording time or recording capacity for a unit volume of the magnetic tape. To provide a compact package of the video and audio tape cassette for a longer playing time has been an important practical need and one of the objects of this invention is to do so.

There is another need for an improved magnetic tape having longer wear-life, for example in the field of modern high-speed computer applications and helical-scan video recording, where the relative speed between the moving tape and the heads is extremely high. The surface of the support film of this invention is essentially tough and hard compared to that of conventional polyester type films, and therefore the tape is hardly scratched, even by incessant contact with the magnetic heads, guide rolls, etc. The consequent result is that neither clogging of heads nor increase of drop-outs and noise occur, even after a long time high-speed operation.

Furthermore, in the case of a coating type magnetic tape, the durability of the coating layer is found to be enhanced because of the high adhesion strength between the support film and the coating layer as the result of good affinity obtained by reason of its chemical composition, that is polyamide, to a polymeric binder. But further strikingly improved durability of the magnetic coating layer can be obtained in accordance with this invention as described below.

The glass transition temperature of the support film of this invention usually ranges from about 250° C to 450° C, whereas that of poly (ethylene terephthalate) is about 60° C to 80° C, which represents a large difference in respect of heat resistance. In order to form a magnetic thin layer on the support film, heat must be applied in an oven for evaporation of the solvents in the coating dispersion, and this is usually done by means of steam or electric heaters. The optimum oven temperature will naturally vary from one type of coating to another, but it is usually controlled to a value below about 100° C – 120° C because the deformation of the poly(ethylene terephthalate) film will take place by subjecting it for several minutes through the oven to a much higher temperature than the glass transition temperature.

This drying temperature limitation presents many important constraints in the tape preparation process. For example, some types of hardening agents such as polyfunctional epoxides and isocyanates, may be present as ingredients of the magnetic composition in order to contribute to the excellent friction characteristics and long wear life of the final magnetic tape. However, these hardening agents cannot react to a full extent under the limited temperature. At the final stage of the hardening reactions they need enough time and enough temperature to become effective, because the mobility of the hardening agents is reduced significantly in the presence of the hard medium.

Another constraint is that a coating dispersion consisting of hardening agents, which can react at the lower curing temperature for a poly-(ethylene terephthalate) support film, naturally has a relatively short pot life. In other words, the number of days that elapse before an appreciable reaction takes place in the dispersion at room temperature is very small.

These constraints are removed according to this invention, by using a specified p-oriented aromatic polycarbonamide film of this invention, which can be subjected to up to 200° C – 250° C for several minutes without harmful deformation, said temperature being high enough for the hardening reaction to take place to a full extent, giving a hard and tough surface to the magnetic coating layer. The stability of the film at a higher temperature will be shown quantitatively in the Examples. The Examples also describe magnetic tape with good bondability between the magnetic layer and the support film, and also with a long wear life, prepared by coating and drying a dispersion comprising of $\gamma$-$Fe_2O_3$, polyepoxide resin and solvents on the p-oriented aromatic polycarbonamide film at a temperature which is too high for curing a poly(ethylene terephthalate) base film.

Having an excellent hygroscopic and thermal linear expansion coefficient which is lower than $2.0 \times 10^{-5}$ mm/mm/relative humidity (%) or mm/mm/° C is also a significant advantage of this invention, which contributes solutions to such problems as skew, that is, dimensional change of a magnetic video tape which occurs during the time gap between recording time and reproducing time owing to the change of circumstance (e.g. temperature, humidity).

For the support film of this invention, the various physical properties are often equally important with respect to both longitudinal and transverse film directions, in other words, for all directions on the film plane. For example, in the case of helical-scan video recording, because of the nature of the tape running system, a higher tensile modulus in the transverse direction is especially required, as compared to a standard audio recording. This point is one of the major differences over the known art of fiber manufacturing, where properties in only one direction were taken into consideration.

The improved dimensional stability of the tape at a higher temperature, for example at 150° to 250° C, is extremely useful for manufacturing a tape designed for magnetic duplication by the thermal process. The principle of the thermal duplication method is very simple. The magnetic coating layer of the slave tape, usually a $CrO_2$ tape, is heated to the Curie temperature (about 130° C) and contacted with the coated side of the recorded master tape, for example, a $\gamma$-$Fe_2O_3$ tape having a Curie temperature of approximately 600° C. When the magnetic coating temperature of the slave tape becomes lower than 80° C, the recorded master tape signal is transferred and fixed on the contacted slave tape. Thermal duplication has the important advantage of high transfer efficiency, as compared to the anhysteretic duplication process which is now acceptable with a conventional polyester tape. The slave tape for thermal duplication, however, has to be heated to 130° C before contacting the master tape, and is then required to be cooled to a temperature lower than 80° C without deforming the support film. The tolerable range of deformation is, for example, a dimensional change of lower than 0.2%, preferably lower than 0.05%, 100 hours after the time of the thermal duplication process. Whereas this requirement is unattainable for a polyester base film which is less than 30 microns thick as predicted from its glass transition temperature, the polyamide base film of this invention is successful in meeting this requirement quite easily. Therefore, this invention is capable of providing a mass production thermal duplication slave tape having a high standard of reliability.

A support film of this invention, which is a p-oriented aromatic polycarbonamide characterized by specific physical properties as above described, may be applied not only to a magnetic recording medium base but also to the area of a flexible printed circuit base, an acoustic diaphragm, an electrical insulation material, an adhesive tape base, a capacitor, a photo process material and to other materials, by taking advantage of its many excellent properties.

The Examples that follow are to be considered illustrative of the invention, and not as limiting the scope of the invention, which is defined in the appended claims.

In connection with the following description in the Examples, reference is made to physical and other measurements, such as degree of planar orientation, density, inherent viscosity, water absorption, hygroscopic dimensional change, and tensile strength and modulus. We will now refer briefly to the preferred methods by which those quantities may be measured and obtained.

The most desirable way to obtain the degree of planar orientation is the X-ray pole figure method. Films of known thickness are stuck to a sample about 400μ thick by means of an amorphous adhesive such as Collodion. The sample is mounted on the pole figure goniometer stage, B-4, of a Rigaku Denki type D-8C X-ray diffractometer and scanned by the reflection method (Schulz method) or transmission method (Deckar method). The sample is rotated stepwise in increments of 2° from 90° to 10° around the Z-axis (machine direction, a-rotation) and at each α-position the sample is rotated within the film plane by 360° (β-rotation). Recording to diffraction intensity, calibration by absorption factor and orientation distribution, and drawing of the pole figure are aided by a computer. A strong diffraction peak is observed between 17° and 25° for this type of film.

So this diffraction intensity is measured for the pole figure. From the pole figure the planar orientation coefficient is calculated as the ratio of in-plane intensity to the total intensity for this diffraction peak.

Various methods are employed for density determination, but a density gradient tube with $CCl_4$-toluene has been used at 25° C in this case. The small pieces of samples are stored in a desiccator with $P_2O_5$ for 72 hours before the measurement.

The inherent viscosity, $\eta inh$, is defined by the following equation.

$$\eta inh = \frac{\ln (\eta rel)}{C}$$

where $\eta_{rel}$ represents the relative viscosity measured at 25° C and C represents a concentration of 0.5 g of the polymer in 100 ml of N-methyl pyrrolidone and 2.5 g of lithium chloride.

Water absorption is measured as follows. A film sample is, at first, kept for more than 72 hours in a desiccator with $P_2O_5$ until a constant weight is reached. Then, the sample is kept in another cell, conditioned at 25° C and 75% RH for more than 48 hours until a constant weight is reached again. The weight increase of the sample with respect to the initial weight is determined to be the water absorption.

Hygroscopic dimensional change is measured in the following way. A tape of ½ inch by 400 mm is conditioned at 20° C and 70% RH for 24 hours under 10g of load and then the humidity around the sample is changed to 90% RH and the length of the sample is measured continuously for more than 12 hours until the leveling off, by Japan Regulater, Inc.'s Tape Elongation Tester Type ITL-2. From this change in length, the hygroscopic linear expansion coefficient is calculated.

Tensile strength and modulus are measured on an "Instron" tensile tester at 20° C and 75% RH, based on JIS L-1073. The tensile modulus is obtained from the initial linear portion of the S-S curve.

EXAMPLE 1

25.7 parts of 2-chloro-p-phenylene diamine and 4.0 parts of 4.4'-diamino diphenyl ether were placed in a reaction vessel fitted with a stirrer, and a solution of 1,000 parts of N-methyl pyrrolidone and 51.0 parts of dehydrated lithium chloride was added. The mixture was stirred for ten minutes to dissolve the diamine and the salt. 40.6 parts of pulverized terephthaloyl chloride were then added to the mixture and stirred for 1 hour at 10° C. Then 148 parts of lithium carbonate were added to neutralize the hydrogen chloride formed during the polymerization at room tempeature. The polymer obtained had an inherent viscosity of 3.85. The polymer solution was cast uniformly at room temperature on a moving endless belt 6 m long and heated at 130° C in air for 10 minutes to evaporate the solvent forming a wet film containing 400 weight % of N-methyl pyrrolidone based on the net polymer weight. The film was dipped peeled off the belt and into a water bath to remove the remaining solvent and salts at room temperature for 20 minutes. The film was fixed to a moving crip and heated in an air oven at 280° C for 5 minutes where the film was stretched to approximately 1.25 times its original dimension in the longitudinal direction and then 1.2 times its original dimension in the transverse direction.

The resulting film had a thickness of 10.2μ and a density of 1.465 g/cm³. Other physical properties of this film are listed below.

|  | Longitudinal | Transverse |
|---|---|---|
| Young's modulus | 1250 | 1070 kg/mm² |
| Tensile strength | 38 | 32 kg/mm² |
| Thermal linear expansion coefficient (25° C to 200° C) | $0.6 \times 10^{-5}$ | $0.7 \times 10^{-5}$ mm/mm/° C |
| Hygroscopic linear expansion coefficient | $0.5 \times 10^{-5}$ | $0.6 \times 10^{-5}$ mm/mm/% relative humidity |
| Water absorption | 1.7% | |
| Planar orientation coefficient | 0.77 | |

This Example illustrates the superiority of a magnetic video tape of this invention, supported on film as stated.

The composition of the magnetic dispersion was, by weight:

|  | Parts |
|---|---|
| $\Gamma Fe_2O_3$ | 100 |
| poly vinyl chloride - vinyl acetate copolymer | 14 |
| "Saran F-216" | 11 |
| Lead stearate | 2 |
| Dioctyl Phthalate | 5 |
| Soya lecithin dispersant | 1 |
| Toluene | 80 |
| Methyl isobutyl ketone | 120 |

"Saran F-216" is poly vinylidene chloride resin, and is sold by Asahi-Dow Chemical Corporation.

The dispersion was milled for two hours using a stirring disc. The dispersion thus formed was filtered through a cloth pad, and spread by means of a doctor blade on the film. After the coated layer was magnetically treated, it was dried at 120° C for 5 minutes. The dry layer was then calendered between a cotton-filled roll and a polished chrome-plated hot roll. The thickness of the magnetic layer was 4.2μ, giving a total video tape thickness of 14.4μ. This video tape was tested on a helical-scan video tape recorder (Panasonic NV3020, Matsushita Electric Industrial Co., Ltd.) and produced the performance data illustrated in Table 1.

TABLE 1

| Tape Deformation | 0.02% |
|---|---|
| Runnability | Excellent |
| Rise time : a | 1.1 m sec |
| Peak out-put : b | 120 mV |
| Skew : C1 | 6 μ sec. |
| Skew : C2 | 8 μ sec. |

The term "tape deformation" as referred to herein was measured in a longitudinal direction after 10 seconds under 160° C and a tension of 100 grams per ¾ inch width. "Runnability" was judged qualitatively from factors such as clogging of head, increase of drop-outs and so forth after a hundred repeated tape playback times. The term "Rise time a" is the time elapsed before the maximum out-put signal (peak out-put) was obtained after the tape touched the reproducing head. "Skew" C1 is the skew caused by the temperature gap between recording time and reproduction time. This is represented by the distance between the vertical line and the skewed line at the bottom of the VTR picture, which skewed line was obtained by reproduction after 24 hours of aging at 80° C of the original tape, where the vertical line was recorded at room temperature (20° C, 60% relative humidity). "Skew" C2 is the skew caused by the relative humidity gap between recording time and reproduction time. This is similarly represented in the manner of skew C1, after 24 hours of aging at 40° C, and at 80% relative humidity. The vertical line was recorded at 20° C, 20% relative humidity.

For the sake of comparison the same magnetic composition layer was formed on commercially available biaxially oriented polyethylene terephthalate (PET) film, in the same way as described above. In this case, the thickness of the PET support film was 12μ and that of the magnetic layer was 4.4μ. The PET support film had the following physical properties:

|  | Longitudinal | Transverse |
|---|---|---|
| Young's modulus | 430 | 410 kg/mm² |
| Tensile strength | 19 | 18 kg/mm² |
| Thermal linear expansion coefficient (25° C to 100° C) | $1.9 \times 10^{-5}$ | $1.6 \times 10^{-5}$ mm/mm/° C |
| Hygroscopic linear expansion coefficient | $1.0 \times 10^{-5}$ | $1.1 \times 10^{-5}$ mm/mm/% relative humidity |
| Water absorption | 0.5% | |

This PET film showed a sudden thermal shrinkage around 120° C, and a shrinkage of more than 7% took place at 160° C. The magnetic tape thus obtained is characterized in Table 2, which can be compared directly with Table 1.

TABLE 2

| Tape Deformation | 8.5% |
|---|---|
| Runnability | poor |
| Rise time : a | 2.5 m sec. |
| Peak out-put : b | 120 mV |
| Skew : C1 | 20 μ sec. |
| Skew : C2 | 18 μ sec. |

EXAMPLE 2

The similar preparative procedure of Example 1 was followed, employing 215 parts of p-phenylene diamine which was dissolved in 1,000 parts of hexamethylphosphoramide with 620 parts of lithium chloride. The solution was then cooled down to −5° C and 474 parts of 2-chloro-terephthaloyl chloride were added. After 2 hours stirring of a polymer solution having a viscosity of 4,200 poise at 25° C, it was cast on a moving endless belt 6 meters long and dipped into cold water for 30 minutes while the film was drawn 1.35 times its original dimension in the longitudinal direction in the water bath. The film was then dried in an air oven at 300° C for 5 minutes and stretched 1.28 times its original transverse dimension, in the transverse direction. The dried film had a thickness of 12.3μ and was subjected to further heat treatment at 450° C for 5 seconds with the film edge fixed on the frame. The film thus obtained had the following physical properties.

|  | Longitudinal | Transverse |
|---|---|---|
| Tensile strength | 58 | 40 kg/mm² |
| Young's modulus | 2350 | 1860 |
| Thermal linear expansion coefficient | $0.4 \times 10^{-5}$ mm/mm/° C | — |
| Hygroscopic linear expansion coeffiient | $0.4 \times 10^{-5}$ mm/mm/% relative humidity | — |
| Water absorption | 1.2% | |

After the surface of this film was activated by the Pd sputtering method, the magnetic layer of Co-P was plated under the following conditions.

| $CoCl_2 \cdot 6H_2O$ | 0.04 g/l |
|---|---|
| Sodium citrate | 0.09 |
| $H_3BO_3$ | 0.5 |
| $NH_4Cl$ | 0.2 |
| $Na_2H_2PO_3$ | 0.05 |
| plating temperature | 80° C |
| plating thickness | 1500 |

Sodium hydroxide was added to adjust pH of the plating solution at 7.7.

The plating video tape was evaluated in the same method as in Example 1. The results are shown in Table 3.

TABLE 3

| Tape deformation | 0.01% |
|---|---|
| Runnability | excellent |
| Rise time : a | 0.8 m sec. |
| Peak out-put : b | 440mV |
| Skew : C1 | 4 μ sec. |
| Skew : C2 | 5 μ sec. |

EXAMPLE 3

This Example illustrates a magnetic recording medium of this invention in the form of a magnetic tape wherein the wear life and durability are excellent compared with the prior art.

The dispersion was prepared by mixing the following composition in a ball-mill.

|  | Parts (by weight) |
|---|---|
| $\Gamma$-$Fe_2O_3$ | 73 |
| "Epon 1001" | 20 |
| Resol type phenol resin | 6.5 |
| Phosphoric acid | 0.5 |
| Lead stearate | 2 |
| Soya lecithin dispersant | 1 |
| Methyl isobutyl ketone | 25 |
| Methyl isobutyl carbinol | 25 |
| Toluene | 25 |
| Xylene | 23 |
| Methyl cyclohexanone | 2 |

"Epon 1001", sold by Shell, is an epoxy resin, synthesized from epichlorohydrine and bisphenol A, having an average molecular weight of 1000 and two epoxy rings at the molecular ends.

A chloro-substituted polyamide was prepared from 100 mol % of 2-chloro-p-phenylene diamine and 100 mol % of terephthaloyl chloride using a solvent mixture of N-methyl-pyrrolidone, Hexamethyl phosphoramide (1/1 by weight) and lithium chloride, calcium hydroxide as additive and neutralizer respectively. A polymer solution consisting of 5.2 weight % of the above polyamide was cast uniformly onto a mirror polished stainless steel drum rotating in a heated air oven, and dried until the film was self-supporting. The said film was stripped from the drum, dipped into a water bath and dried again at 300° C for 5 minutes. After heat treatment at 480° C for 5 seconds, a film 11.2$\mu$ thick, for use as the magnetic tape base, was obtained.

The dispersion was coated on the above film and had a magnetic layer thickness of 3.5$\mu$ (dry base). The magnetic tape was produced by magnetic orientation, drying and calendering. For the sake of comparison, the same procedure was followed to produce a support film of commercially available polyethylene terephthalate of 14$\mu$ thickness, and in order to prepare a magnetic tape of the polyester film. The curing of the magnetic layer was carried out in an air oven for 20 minutes at 120°, 140°, 160° and 180° C for each of the magnetic tapes. The mechanical properties of each magnetic tape are shown in Table 4.

TABLE 4

| Support film | Curing Temperature | Tape Appearance | Adhesion | Gross Wear |
|---|---|---|---|---|
| Polyethylene terephthalate | 120° C | Good | 40 | 0.054 |
|  | 140 | Poor | 70 | 0.041 |
|  | 160 | not acceptable | — | — |
|  | 180 | " | — | — |
| Example 3 | 120° C | Good | 70 | 0.051 |
|  | 140 | " | 80 | 0.040 |
|  | 160 | " | 100 | 0.018 |
|  | 180 | " | 100 | 0.005 |

"Tape appearance" was judged qualitatively upon the basis of curl, crease and other surface appearances or or defects of the tape. A curing temperature over 150° C was found unacceptable for the polyester film base because of severe tape deformation, whereas temperatures up to 200° C were found applicable and entirely effective for the curing of the tape of this invention.

"Adhesion" is reported on a scale of 0 (very poor) to 100 (excellent) by qualitative tests performed by pressing the coating side of a magnetic tape into contact with a strip (5–7 cm long and 12.7 mm wide) of commercially available pressure-sensitive tape, then separating the two tapes by rapidly pulling them apart and measuring the approximate percent of magnetic coating retained on the magnetic tape. These tests showed that a high adhesion strength is obtained for the tape of this invention, due to the excellent thermal stability of the support film and the good affinity between the support and the magnetic layer.

"Gross wear" represents the rate of degradation of the coating and is expressed in $\mu$ per minute for a loop of magnetic tape running against a stainless steel cylinder and guide posts with the tension adjusted so that a high quality commercial magnetic tape wears at a rate of 0.04$\mu$ per minute. The data in Table 4 are indicative of the long wear life and the excellent runnability of the magnetic tape produced in accordance with this invention.

Commercially available so-called tensilized polyethylene terephthalate film has worse dimensional stability than the regular biaxially oriented polyester film above exemplified, and its tape appearance becomes poor even at a curing temperature of 120° C.

EXAMPLE 4

This Example illustrates the feasibility of the use of the magnetic tape of this invention in a thermal duplication process.

The composition of the magnetic layer is as follows:

|  | Parts (by weight) |
|---|---|
| $CrO_2$ | 80 |
| "Epon 1001" | 20 |
| Resol type phenol resin | 6.5 |
| Phosphoric acid | 0.5 |
| Lead stearate | 2 |
| Soya lecithin dispersant | 1 |
| Methyl isobutyl ketone | 25 |
| Methyl isobutyl carbinol | 25 |
| Toluene | 25 |
| Xylene | 23 |
| Methyl cyclohexanone | 2 |

The magnetic tape was obtained by the same procedure as Example 3, except for the change of the magnetic composition. The polyester base magnetic tape with the above composition was also prepared as shown in Example 3. In both cases, the curing process was carried out at 105° C for 10 minutes and tape deformation did not take place.

Both magnetic tapes were cut into strips 5 cm long and 0.5 inch wide. On both strips two marks were applied by use of a knife-edge, approximately 3 cm apart, and the exact distances between the marks A(cm) were measured by means of a microscope, under a tension of 0.5 g weight per 0.5 inch after aging for 24 hours at 20° C, 50% relative humidity. These samples were then placed into an air oven at 150° C for 1 minute under a tension of 5 g weight per 0.5 inch, and after aging for 100 hours at 20° C, 50% relative humidity under a tension of 0.5 g weight per 0.5 inch, the distances between marks B(cm) were measured again. Thermal deformation is defined as follows, and the results are shown in Table 5.

$$\text{Thermal deformation (\%)} = \left(\frac{B}{A} - 1\right) \times 100$$

The absolute value of thermal deformation as above defined is preferably below 0.05% in both directions, to obtain a high quality magnetic tape for thermal duplication. The tape of this invention shows highly satisfactory thermal stability, whereas the tape made of polyethylene terephthalate film shows very poor dimensional stability around the Curie point of CrO₂, which is above its glass transition point by more than 50° C.

TABLE 5

| Support film | Direction | Thermal Deformation (%) |
|---|---|---|
| Polyethylene terephthalate | longitudinal (machine) | −2.5 |
| | transverse | −0.8 |
| Example 4 | longitudinal (machine) | −0.01 |
| | transverse | −0.02 |

EXAMPLE 5

27.0 g of p-phenylenediamine were dissolved in a solvent mixture of 500 g of hexamethylphosphoramide and 500 g of N-methyl-2-pyrrolidone in a reaction kettle equipped with a high-speed blender. Then 50.7 g of powdered terephthaloyl chloride were added to the mixture and the mixture was stirred at 10° C until a solid mass of polymer was obtained within several minutes. The polymer having an inherent viscosity of 4.50 in concentrated sulfuric acid was washed three times with water and once with acetone in a blender, and isolated by filtration. The filtered polymer was dried in a vacuum oven at 80° C for more than 10 hours.

30.0 g of the dried polymer, above prepared, was mixed with 500.0 g of fuming sulfuric acid. The mixture was stirred for about one hour, and a clear viscous dope was obtained. The dope was cast uniformly on the glass plate at room temperature, and it was dipped into a cold water bath where a polymer was coagulated into solid film. After being peeled off the plate, the film was dried in an air oven at 300° C for 3 minutes and at 450° C for 10 seconds.

The film thus obtained had a thickness of 9.7μ and a density of 1.458 g/cm². Other physical properties of this film are listed below. (Longitudinal and transverse directions have approximately the same values for each property).

| | |
|---|---|
| Tensile strength | 31 kg/cm² |
| Elongation | 12 % |
| Young's modulus | 1050 kg/cm² |
| Water absorption | 2.5% |
| Planar orientation coefficient | 0.75 |

The magnetic dispersion described in Example 3 was coated on the above support film and a video tape was prepared, using the same method as shown in Example 3. (The curing temperature was 180° C).

The video tape in this Example showed excellent runnability in a helical-scan video playback machine exhibiting less than one tenth of the gross wear of the high quality commercial video tape. The values of skew C1, C2 as defined in Example 1 were 0.2 and 0.3 m sec respectively.

We claim:
1. Magnetic recording medium comprising a layer of magnetizable material and a flexible support material prepared from a high molecular weight p-oriented polycarbonamide consisting of at least about 70 mole % of recurring units of a formula selected from the group consisting of:

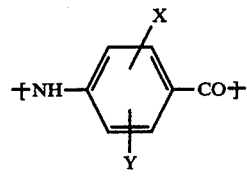

and

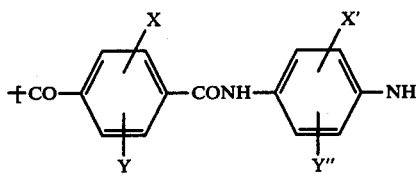

and mixtures thereof, wherein: X, Y, X' and Y' are monovalent radicals attached to a nuclear carbon and are selected from the group consisting of hydrogen, halogen, nitro and alkyl and alkoxy having from 1 to 3 carbon atoms, 0–30 mole % of other copolymeric units whenever present constituting such recurring units as m-phenylene

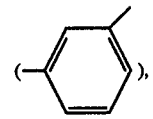

urethane (—NHCOO—), urea (—NHCONH—), ester (—COO—), hydrazide (—CONHNH—), ether (—O—), and aliphatic hydrocarbon groups ($C_1$–$C_3$),
said flexible material having a tensile modulus in excess of 800 kg/mm² and up to 20,000 kg/mm² at least in one direction, a water adsorption of less than 2.0 wt. % at 25° C and 75% relative humidity and a hydroscopic linear expansion coefficient of less than $1.0 \times 10^{-5}$ mm/mm/% at least in one direction.

2. Magnetic recording medium of claim 1, wherein said flexible support material has a density of more than about 1.41 g/cm³ and less than about 1.70 g/cm³ at 25° C and 0% relative humidity.

3. Magnetic recording medium of claim 1, wherein said tensile modulus is in excess of 800 kg/mm² and of up to 10,000 kg/mm² in all directions on the plane.

4. Magnetic recording medium of claim 1, wherein said flexible support material has a thermal linear expansion coefficient of less than about $2.0 \times 10^{-5}$ mm/mm/° C at least in one direction.

5. Magnetic recording medium of claim 1, wherein said flexible support material has a tensile strength in excess of about 20 kg/mm² and up to about 150 kg/mm² in all directions on the film plane.

6. Magnetic recording medium of claim 1, wherein all of X, Y, X' and Y' are hydrogen.

7. Magnetic recording medium of claim 1, wherein at least one of X, Y, X', Y' is chlorine and the others are hydrogen.

8. Magnetic recording medium of claim 1, wherein the magnetizable material is a CrO₂ type compound.

9. Magnetic recording medium of claim 1, wherein said flexible support material consists essentially of at least about 95 mol % of said recurring units of said formula (I) and/or (II).

10. Magnetic recording medium of claim 9, wherein at least one of X, Y, X', Y' is chlorine and the others are hydrogen.

11. In a magnetic recording medium the improvement which comprises a layer of magnetizable material and flexible support material of a high molecular weight p-oriented polycarbonamide consisting of at least about 70 mole % of recurring units of a formula selected from the group consisting of

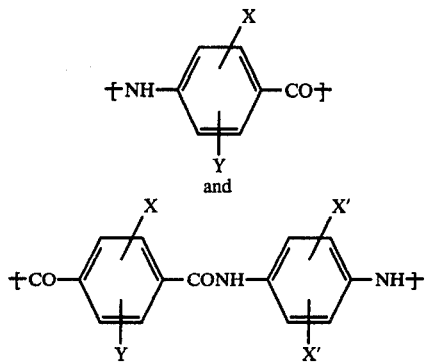

and mixtures thereof, wherein: X, Y, S' and Y' are monovalent radicals attached to a nuclear carbon and are selected from the group consisting of hydrogen, halogen, nitro and alkyl and alkoxy having from 1 to 3 carbon atoms, at least one of said X., Y, X' and Y' being halo, 0–30 mole % of other copolymeric units whenever present constituting such recurring units as m-phenylene

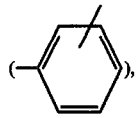

urethane (—NHCOO—), urea (—NHCONH—), ester (—COO—), ether (—O—), and methylene (—CH$_2$—), said flexible material having a tensile modulus in excess of 800 kg/mm$^2$ and up to 20,000 kg/mm$^2$ at least in one direction, a water adsorption of less than 2.0 wt. % at 25° C and 75% relative humidity and a hydroscopic linear expansion coefficient of less than 1.0 × 10$^{-5}$ mm/mm/% at least in one direction.

12. Magnetic recording medium comprising a layer of magnetizable material and a flexible support material of a high molecular weight p-oriented polycarbonamide consisting of at least about 70 mole % of recurring units of a formula selected from the group consisting of

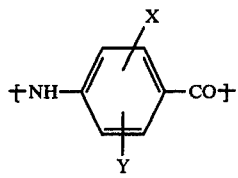

-continued
and

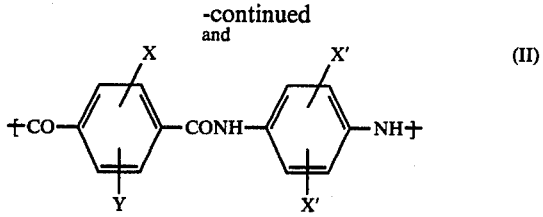

and mixtures thereof, wherein: X, Y, X' and Y' are monovalent radicals attached to a nuclear carbon and are selected from the group consisting of hydrogen, halogen, nitro and alkyl and alkoxy having from 1 to 3 carbon atoms, 0 – 30 mole % of other copolymeric units whenever present constituting such recurring units as m-phenylene

urethane (—NHCOO—), urea (—NHCONH—), ester (—COO—), hydrazide (—CONHNH—), ether (—O), and aliphatic hydrocarbon groups (C$_1$ - C$_3$), said flexible material having a tensile modulus in excess of 800 kg/mm$^2$ and up to 20, kg/mm$^2$ at least in one direction, a water adsorption of less than 2.0 wt. % at 25° C and 75% relative humidity and a hydroscopic linear expansion coefficient of less than 1.0 × 10$^{-5}$ mm/mm/% at least in one direction, said flexible support material being substantially free of organic solvent and inorganic ionic compounds, and having been prepared by heating to the polymer crystallization temperatures while preventing free shrinkage in the machine direction and in the transverse direction.

13. Magnetic recording medium of claim 12, wherein said flexible support material has a density of more than about 1.41 g/cm$^3$ and less than about 1.70 g/cm$^3$ at 25° C and 0% relative humidity.

14. Magnetic recording medium of claim 12, wherein said tensile modulus is in excess of 800 kg/mm$^2$ and of up to 10,000 kg/mm$^2$ in all directions on the plane.

15. Magnetic recording medium of claim 12, wherein said flexible support material has a thermal linear expansion coefficient of less than about 2.0 × 10$^{-5}$ mm/mm/° C at least in one direction.

16. Magnetic recording medium of claim 12, wherein said flexible support material has a tensile strength in excess of about 20 kg/mm$^2$ and up to about 150 kg/mm$^2$ in all directions on the film plane.

17. Magnetic recording medium of claim 12, wherein all of X, Y, X' and Y' are hydrogen.

18. Magnetic recording medium of claim 12, wherein at least one of X, Y, X', Y' is chlorine and the others are hydrogen.

19. Magnetic recording medium of claim 12, wherein said flexible support material consists essentially of at least about 95 mole % of said recurring units of said Formula (I) and/or (II).

* * * * *